(12) United States Patent
Fayez et al.

(10) Patent No.: US 12,360,280 B2
(45) Date of Patent: Jul. 15, 2025

(54) DETERMINING RESERVOIR FORMATION FACIES

(71) Applicant: Saudi Arabian Oil Company, Dhahran (SA)

(72) Inventors: Fahad A. Fayez, Dammam (SA); Hisham Faqehi, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 277 days.

(21) Appl. No.: 18/134,895

(22) Filed: Apr. 14, 2023

(65) Prior Publication Data

US 2024/0345280 A1    Oct. 17, 2024

(51) Int. Cl.
*G01V 5/06*    (2006.01)
*E21B 49/00*    (2006.01)

(52) U.S. Cl.
CPC ............... *G01V 5/06* (2013.01); *E21B 49/00* (2013.01)

(58) Field of Classification Search
CPC ................................. G01V 5/06; E21B 49/00
See application file for complete search history.

(56) References Cited

U.S. PATENT DOCUMENTS 9,939,548 B2    4/2018    Burmester et al.
2007/0246649 A1*   10/2007   Jacobi .................... G01V 5/101
                                                       250/269.6

OTHER PUBLICATIONS

Davies et al., "Spectral gamma ray characterization of high-resolution sequence stratigraphy: examples from Upper Carboniferous fluvio-deltaic systems, County Clare, Ireland," Geological Society, London, Special Publications, Jan. 1996, 104(1):25-35, 11 pages.

Dypvik et al., "Natural radioactivity of clastic sediments and the contributions of U, Th and KJ pet," Journal of Petroleum Geology, Apr. 1983, 5(4):409-414, 7 pages.

Ferguson et al., "Subsurface stratigraphy, depositional history, and reservoir development of the Early-to-Late Permian Unayzah Formation in central Saudi Arabia," Middle East Oil Show, Nov. 1991, 10 pages.

Knox et al., "Heavy mineral stratigraphy of the Unayzah Formation and Basal Khuff Clastics (Carboniferous to Permian) of Central Saudi Arabia," GeoArabia, Jul. 2010, 15(3):17-80, 64 pages.

(Continued)

*Primary Examiner* — Kiho Kim
(74) *Attorney, Agent, or Firm* — Fish & Richardson P.C.

(57) ABSTRACT

Techniques for determining facies of a subterranean reservoir include identifying spectral gamma ray (SGR) logging data measured with an SGR logging tool in a wellbore that extends from a terranean surface into a subterranean reservoir included of a plurality of facies that include at least a first facies and a second facies; identifying logging data associated with a particular mineral in at least one of the plurality of facies measured with a logging tool in the wellbore; correlating the SGR logging data with the logging data associated with the particular mineral across the plurality of facies of the subterranean formation; determining a boundary between the first facies and the second facies based on the correlation; and preparing graphical data associated with the determined boundary between the first and second facies for presentation on a graphical user interface (GUI).

24 Claims, 4 Drawing Sheets

(56) References Cited

OTHER PUBLICATIONS

Marett et al., "Logs, Charts, and Computers: The History of Log Interpretation Modeling," The Log Analyst, presented at the London Chapter LASER Symposium, London, England, Dec. 13-15, 1989, 20 pages.
The Late Paleozoic Glacial Events and Postglacial Transgressions in Gondwana, Special Paper 468, Aug. 2010, pp. 37-80, 45 pages.
North et al., "Spectral gamma-ray logging for facies discrimination in mixed fluvial-eolian successions: A cautionary tale," AAPG bulletin, Jan. 1999, 83(1):155-169, 15 pages.
Log Interpretation Principals/Applications, Schlumberger, 1989, Chapter 3, pp. 38 and 39, 2 pages.
Sedimentary basins and petroleum geology of the Middle East, Elsevier, 1997, 890 pages.
Wender et al., "Paleozoic (Pre-Khuff) Hydrocarbon Geology of the Ghawar Area, Eastern Saudi Arabia," GeoArabia, Apr. 1998, 3(2):273-302, 30 pages.

\* cited by examiner

DETERMINING RESERVOIR FORMATION FACIES

TECHNICAL FIELD

The present disclosure describes systems and methods for determining reservoir formation facies and, more particularly, systems and methods for distinguishing particular reservoir formation facies through spectral gamma ray data.

BACKGROUND

Certain clastic reservoirs introduce controversial complexity on differentiating between its formation layers (or facies). Stratigraphic correlation using conventional well logs as essential distinguishers between the layers can be challenging.

SUMMARY

According to the present disclosure, an example implementation includes a computer-implemented method for determining facies of a subterranean reservoir. The example method includes identifying, with one or more hardware processors, spectral gamma ray (SGR) logging data measured with an SGR logging tool in a wellbore that extends from a terranean surface into a subterranean reservoir included of a plurality of facies that include at least a first facies and a second facies; identifying, with the one or more hardware processors, logging data associated with a particular mineral in at least one of the plurality of facies measured with a logging tool in the wellbore; correlating, with the one or more hardware processors, the SGR logging data with the logging data associated with the particular mineral across the plurality of facies of the subterranean formation; determining, with the one or more hardware processors, a boundary between the first facies and the second facies based on the correlation; and preparing, with the one or more hardware processors, graphical data associated with the determined boundary between the first and second facies for presentation on a graphical user interface (GUI).

In an aspect combinable with the example implementation, the particular mineral includes a heavy mineral.

In another aspect combinable with any of the previous aspects, the heavy mineral includes zircon.

In another aspect combinable with any of the previous aspects, the heavy mineral is associated with glacial and proximal fluvial deposits.

In another aspect combinable with any of the previous aspects, the logging data associated with the mineral includes at least one of density, neutron, or sonic logging data of the subterranean reservoir that includes a plurality of minerals including the particular mineral.

Another aspect combinable with any of the previous aspects further includes separating, with the one or more hardware processors, logging data of the particular mineral from logging data of the plurality of minerals; generating, with the one or more hardware processors, a curve associated with the logging data of the particular mineral; and overlaying, with the one or more hardware processors, the curve associated with the logging data of the particular mineral with a curve of the SGR logging data.

In another aspect combinable with any of the previous aspects, the first facies includes at least one shale rock type, and the second facies includes at least one heavy mineral rock type.

In another aspect combinable with any of the previous aspects, the first facies is at least one of the Unayzah A facies, the Unayzah B facies, or the Jauf facies.

In another aspect combinable with any of the previous aspects, the second facies is the Unayzah C facies.

The example implementation can also be implemented in a computing system and one or more tangible, non-transitory computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Example implementations for determining one or more reservoir formation properties according to the present disclosure can be embodied in computer-implemented methods, computing systems, and computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Implementations of systems and methods for determining reservoir formation layers according to the present disclosure can include one, some, or all of the following features. For example, systems and methods according to the present disclosure can provide an effective solution to differentiate between stacked clastic reservoirs. As another example, systems and methods according to the present disclosure can utilize spectral gamma ray logs and other conventional logs to differentiate facies in a reservoir formation, e.g., without the necessity to cut core (which can be an expensive operation). Another example, systems and methods according to the present disclosure can distinguish sand units, which can facilitate generating new prospects for exploration by targeting each unit separately.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of computer-implemented systems, methods, and apparatus, as well as workflows, for determining reservoir formation facies and, more particularly, systems and methods for distinguishing particular reservoir formation facies through spectral gamma ray data. For example, certain hydrocarbon-bearing reservoirs are subdivided (for example, informally) into multiple members, or facies. An example of such a reservoir exists in the Unayzah formation of Saudi Arabia, which includes the Unayzah A, B, and C facies. Bounding the Unayzah formation is the Jauf formation, bounding the Jauf formation is the Tawyil formation. In formations with multiple facies, each facies can consist of particular rock formations (or a particular type of rock). Continuing with the Unayzah example, the Unayzah C consists of mainly reworked fluvioglacial clastic sediments representing depositional outwash produced during times of glacial retreat. Unayzah A/B can consist of mainly shale rock.

In such cases, namely when facies of a formation consist of different rock types (and also due to varying thickness of each facies), detailed stratigraphic correlation of the facies in a reservoir can be challenging when using only seismic data and conventional well logs. One challenge is because of thickness and facies variations among the formation members, as well as significant erosional and non-depositional hiatuses across a formation. Core data can be used to differentiate between facies in a formation (and to determine, approximately, boundaries or "tops" between facies). However, cores are not cut in every well due to operational and cost reasons. When cores are unavailable, boundaries (or tops) between facies may be omitted or erroneously picked or determined at a wrong depth in the formation.

The present disclosure describes processes that provide for more accurate determinations of facies identification as well as boundary determinations between facies with the use of spectral gamma-ray (SGR) data. In particular, such SGR data, in combination with other logging data, can be used to determine facies boundaries in un-cored lithologic sections. Unlike cores, SGR data is often acquired in wells, such as for clay typing and source rock characterization. This SGR data can also be used to identify certain characteristics of facies within a formation at a more efficient cost than core gathering.

In some aspects, rock types in certain facies can consist of rocks that produce gamma radiation through natural emissions, such as isotopes of potassium (K), thorium (Th), and uranium (U); often, these rock types (and others) are called "heavy minerals." The relative contributions of these isotopes in a facies of a reservoir can be differentiated by SGR logging data, which provides a process to estimate mineralogy, differentiate depositional environments, and recognize significant stratigraphic surfaces. Other heavy minerals, such as zircon allanite, monazite, and sphene can be generally associated with a relatively high abundance of Uranium or Thorium (or both) in sandstone facies. In relation to Potassium, typical ratios of Thorium (Th/K) and Uranium (U/K) values in these minerals are above 25 ppm/% and 20 ppm/% respectively.

Such SGR logging data that can be used in processes and workflows in the present disclosure can be obtained by an SGR logging tool. Other logging data, such as density, neutron, and sonic can also be taken by a logging tool and used in the processes and workflows in the present disclosure. To that end, FIG. 1 is a schematic drawing of a spectral gamma ray (SGR) logging system that can provide SGR logging data, as well as other logging data, for a subterranean reservoir with multiple facies according to the present disclosure.

Figure 1:
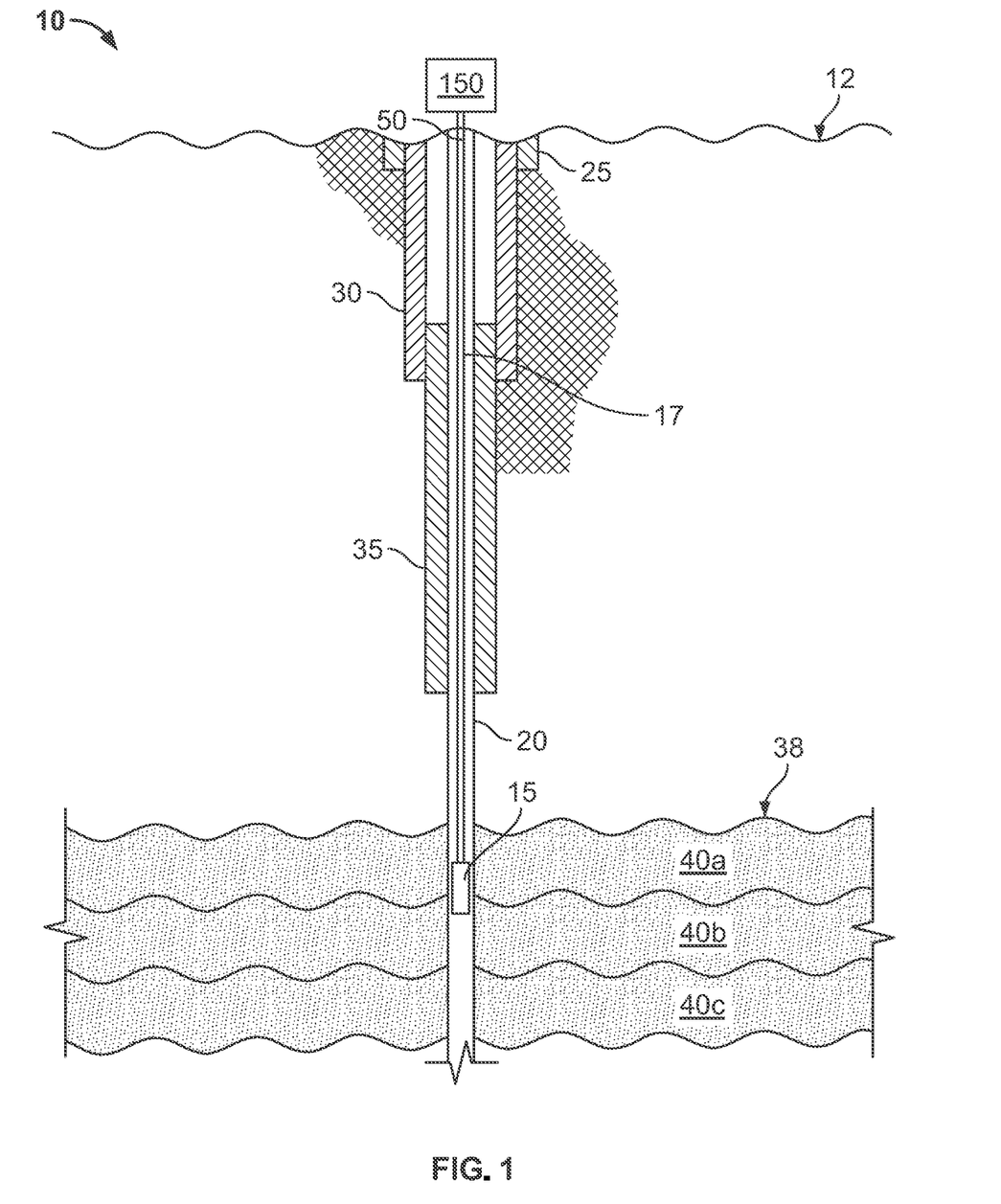
FIG. 1 is a schematic drawing of a spectral gamma ray (SGR) logging system that can provide SGR logging data, as well as other logging data, for a subterranean reservoir with multiple facies according to the present disclosure.

FIG. 1 illustrates an example well system 10, which includes an SGR logging tool 15 to generate an SGR log of a reservoir formation 38 that includes multiple facies 40a, 40b, and 40c. In some aspects, reservoir formation 38 can represent multiple formations, with one or more of the facies 40a-40c being a part of a first reservoir formation and one or more of the facies 40a-40c being a part of a second reservoir formation that is different that the first reservoir formation. The generated SGR logging data taken by the SGR logging tool 15 can be provided to a control system 150 and used, for example, in the example method 200 (described herein).

In this example, as shown, the well system 10 includes a wellbore 20 that is formed (for example, drilled) from a terranean surface 12 (whether on land or under a body of water) through multiple geologic formations, including reservoir formation 38. The wellbore 20, although shown as vertical, can be directional, horizontal, slanted, or lateral or a combination thereof. The SGR logging tool 15 can extend and be moved (run into or out of the wellbore 20) on a downhole conveyance 17 (for example, wireline or otherwise) from a downhole conveyance system 50. In some aspects, as shown, one or more casings 25, 30 and/or 35 can be installed (for example, cemented into) the wellbore 20. In some aspects, all or a part of the wellbore 20 can be open hole.

The SGR logging tool 15 can record naturally occurring radioactive emissions from rocks in the reservoir formation 38 (such as within facies 40a-40c). For example, elements such as uranium, thorium, potassium, radium, and radon, along with the minerals that contain them, emit radioactive gamma rays. The SGR logging tool 15 measures such gamma rays emitted from the facies 40a-40c during runs into and out of wellbore 20 on the downhole conveyance 17. IN spectral gamma ray detection, energy of a captured gamma ray (by the tool 15) is proportional to a brightness of a light pulse that the ray produces. The brightness determines a size of the electrical pulse produced by a photomultiplier. By sorting the pulses from the photomultiplier into bins by size, a spectrum equivalent to an energy spectrum of the incoming gamma rays is produced. The energy of the gamma rays is determined by which element emitted the rays, such as uranium, thorium, potassium, and others. Thus, logging data by the SGR logging tool 15 can provide data that differentiates between certain rock types and heavy minerals.

The well system 10 can also be used to log the reservoir formation 38 (including facies 40a-40c) with other, conventional logging equipment, such as sonic, density, and neutron logging tools. In some aspects, therefore, a logging tool 15 (rather than SGR logging tool 15) can be run into and out of the wellbore 20 on the downhole conveyance 17 to log the reservoir formation 38. This logging data (in other words, one or more of neutron, density, and sonic logging data of the reservoir formation 38) can be transmitted to or otherwise stored (even if transiently) and processed by the control system 150, along with the SGR logging data.

Figure 3:
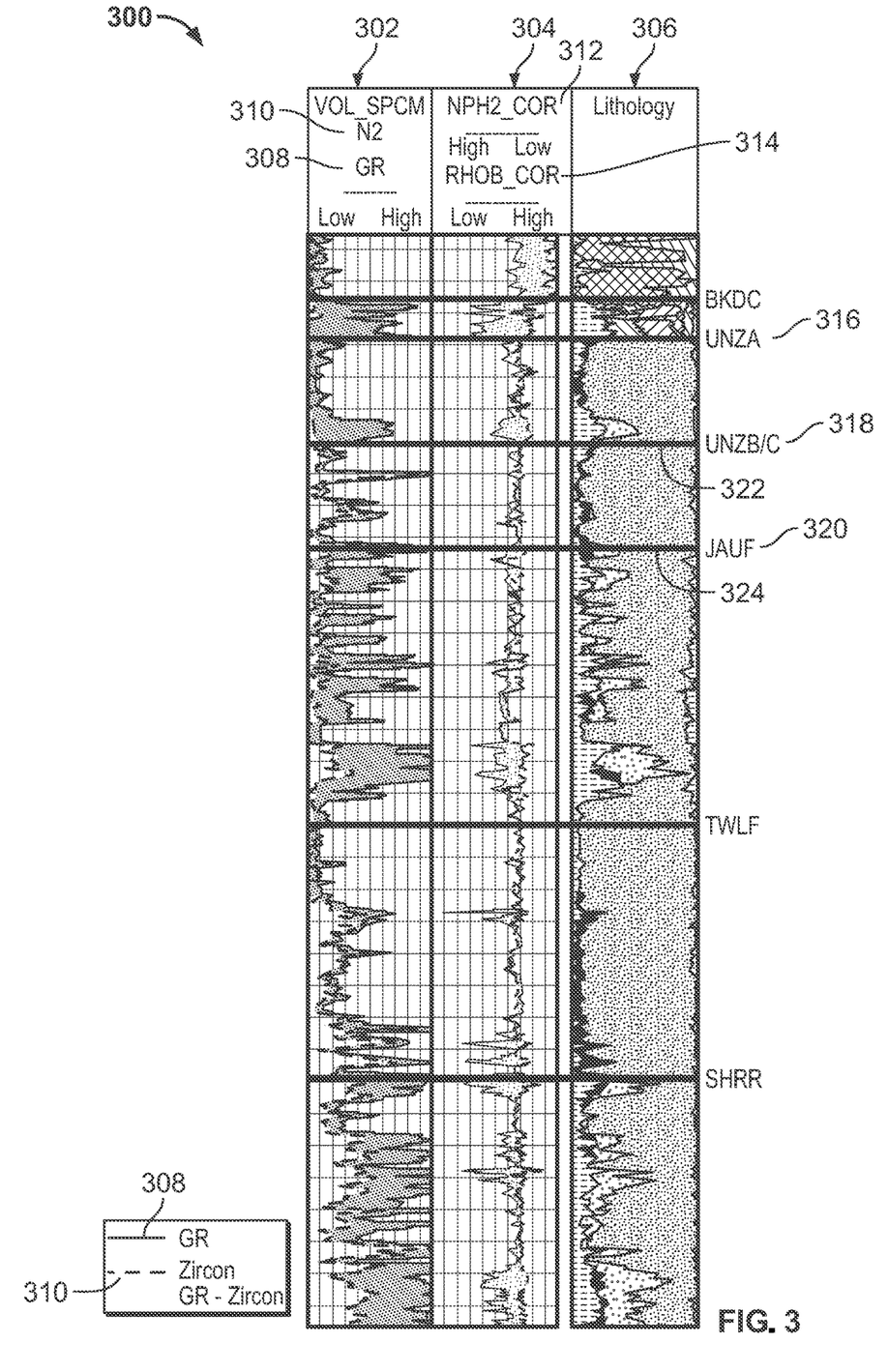
FIG. 3 is a graphic illustration of logging data of a subterranean reservoir with multiple facies, including SGR, neutron, density, and sonic logging data according to the present disclosure.

Turning briefly to FIG. 3, this figure is a graph 300 of logging data of a subterranean reservoir with multiple facies, including SGR, neutron, density, and sonic logging data according to the present disclosure. In this example, the multiple facies of this logging data represents facies of Unayzah A facies 314, Unayzah B/C facies 318, and Jauf facies 320. As shown, graph 300 includes log 302, log 304, and log 306. Log 302 shows an overlay of SGR logging data 308 and a heavy mineral logging curve 310 that represents a particular mineral, in this case, zircon. Log 304 includes neutron log 312 and density log 314 of the reservoir formation. Log 306 shows a lithology of the reservoir formation (including facies 316, 318, 320, and others as shown).

Figure 2:
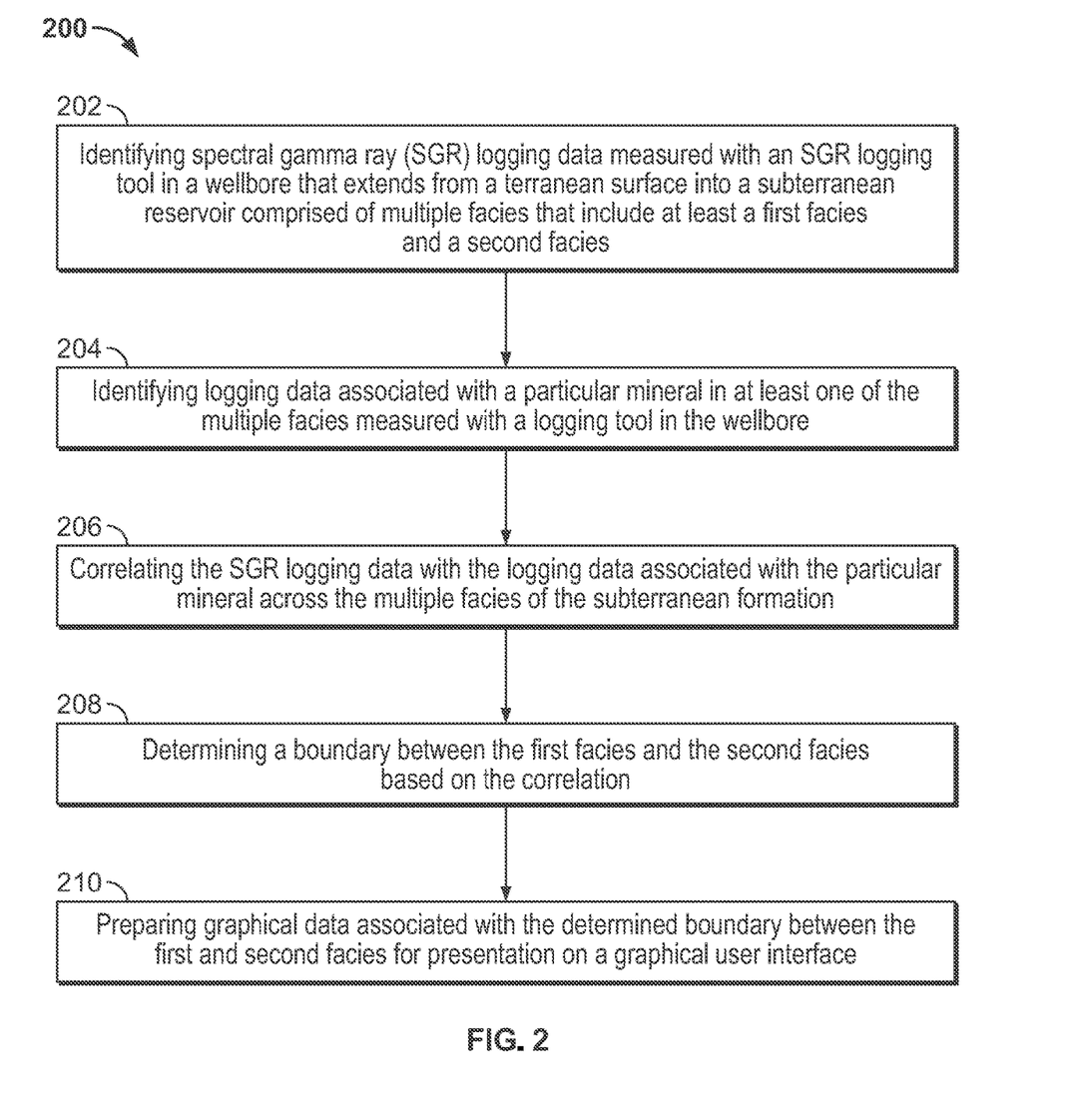
FIG. 2 is a flowchart that describes an example implementation of a method for determining a particular facies among multiple facies in a subterranean reservoir according to the present disclosure.

FIG. 2 is a flowchart that describes an example implementation of a method 200 for determining a particular facies among multiple facies in a subterranean reservoir according to the present disclosure. In some aspects, method 200 can be executed by the control system 150 or other micro-processing equipment (for example, a computing system or distributed computer network). Method 200, in some aspects, uses the logging data and SGR logging data (raw or processed) as described with reference to FIG. 1.

Method 200 can begin at step 202, which includes identifying spectral gamma ray (SGR) logging data measured with an SGR logging tool in a wellbore that extends from a terranean surface into a subterranean reservoir comprised of multiple facies that include at least a first facies and a second facies. For example, SGR logging tool 15 can measure SGR logging data 308 as the tool 15 runs (generally) out of the wellbore and through reservoir formation 38; however, in some aspects, such as during LWD operations, the SGR logging tool 15 can log while running into the wellbore 20.

Method 200 can continue at step 204, which includes identifying logging data associated with a particular mineral in at least one of the multiple facies measured with a logging tool in the wellbore. For example, logging data 312 and 314 (neutron and density data, respectively) can be generated by a separate logging tool 15 that is run into the wellbore 20 and through reservoir formation 38. In some aspects, the particular mineral can be a heavy mineral such as zircon (or other type of heavy mineral). The zircon logging curve 310 can be determined, for example, through the neutron log 312 and density log 314, and solved-for by an optimizing petrophysics approach. Such an approach can evaluate mineral volumes by optimizing simultaneous equations described by a set of interpretation models. Log measurements (such as the neutron log 312 and density log 314) and response parameters are used together in response equations to compute volumetric results for formation rock components. In some aspects, introducing a heavy mineral (such as zircon) in a petrophysical model (for example, as a probabilistic method) governed by a volume of log responses with constant volumes can provide for particular parameters to generate the zircon logging curve 310, such as: density RHOB: 4.51; neutron TNPH: 0.009; sonic DT: 95.8; and Spectral Gamma (Uranium): 1338. Such volumes are calibrated to predict the zircon logging curve 310. The generated zircon logging curve 310 can be overlaid the SGR logging data 308 in log 302 to show a graphical illustration of the comparison.

Method 200 can continue at step 206, which includes correlating the SGR logging data with the logging data associated with the particular mineral across the multiple facies of the subterranean formation. For example, as the generated zircon logging curve 310 is overlaid the SGR logging data 308, a comparison or correlation of the two sets of data can be made. For example, using a compatible scale (0-0.05% vs 0-200 GAPI), an overlay of the zircon logging curve 310 and SGR logging data 308 is made across the reservoir formation and in particular, facies 316, 318, and 320. As shown in FIG. 3, in the Unayzah B/C facies 318 (between Unayzah A facies 316 and Jauf facies 320), the zircon logging curve 310 "curve fits" or otherwise substantially matches the SGR logging data 308, thereby indicating that the high gamma ray measured in this facies 318 is related to heavy minerals (such as zircon) as opposed to another rock type, such as shale (which, based on core sampling, is more prevalent in the Unayzah A facies 316).

Method 200 can continue at step 208, which includes determining a boundary between the first facies and the second facies based on the correlation. For example, boundaries between facies, such as between Unayzah B facies 316 and Unayzah C facies 318 with high level of accuracy, or between Unayzah Jauf facies 318 and TWLF facies 320 with lower accuracy, can be determined by how well the zircon logging curve 310 curve fits or otherwise substantially matches the SGR logging data 308. For instance, a boundary 322 can be determined between the Unayzah B facies 316 and the Unayzah C facies 318 because the zircon logging curve 310 does not substantially match the SGR logging data 308 in Unayzah B facies 316 (while there is a substantial match in Unayzah C facies 318). As another example, a boundary 324 can be determined between the JAUF facies 318 and the TWLF facies 320 because the zircon logging curve 310 does substantially match the SGR logging data 308 in JAUF facies 318 (while there is not a substantial match in TWLF facies 330).

Method 200 can continue at step 210, which includes preparing graphical data associated with the determined boundary between the first and second facies for presentation on a graphical user interface. For example, boundaries 322 and 324 can be inserted or marked on log 306 (as well as logs 302 and 304). Other graphical forms of the determined boundaries 322 and 324 (and others) can also be presented on control system 150.

Figure 4:
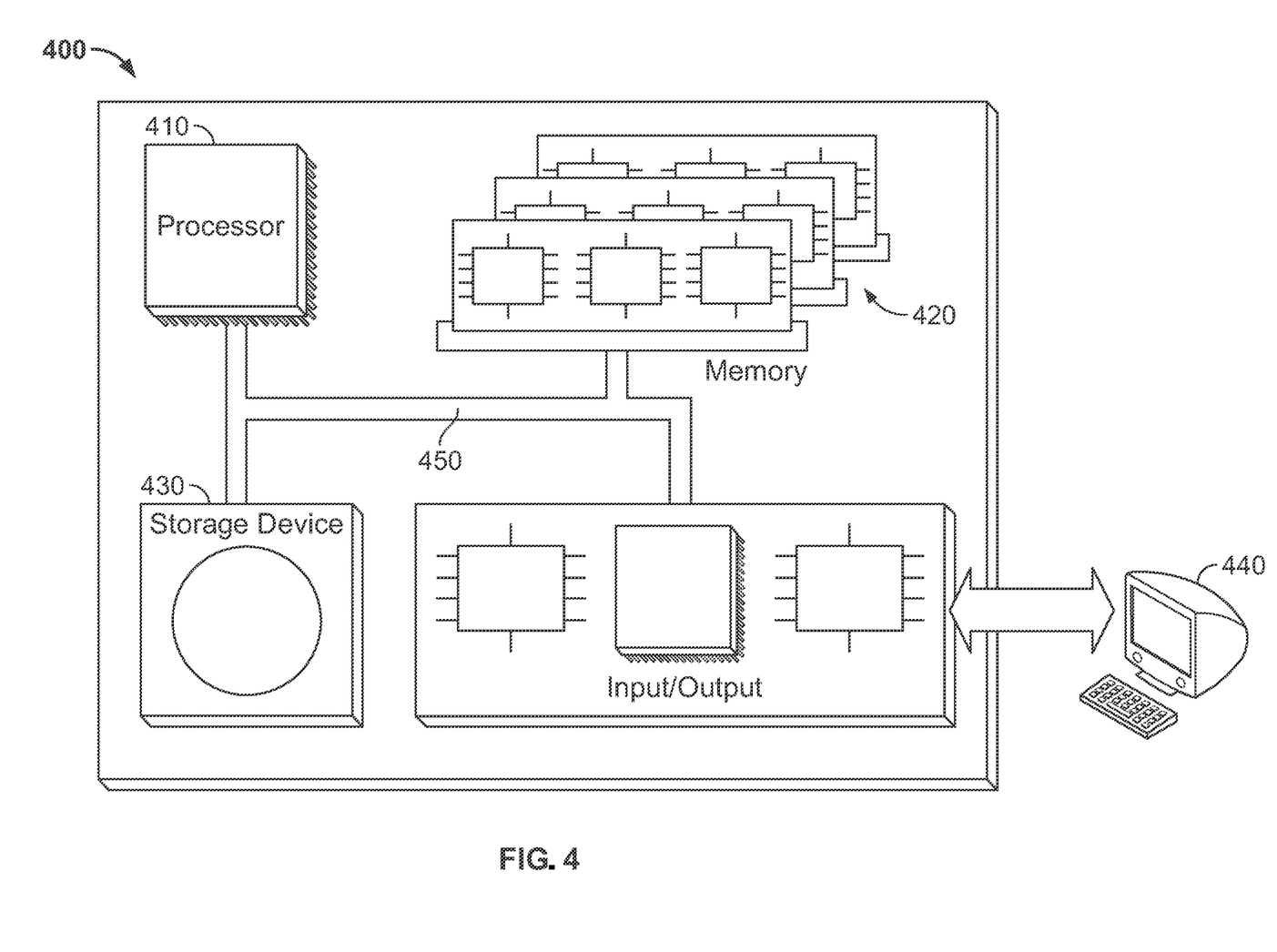
FIG. 4 shows a schematic drawing of a control system that can be used in the example method of FIG. 2 according to the present disclosure.

FIG. 4 shows a schematic drawing of a control system 400 that can be used in the example method of FIG. 2 according to the present disclosure. For example, all or parts of the control system (or controller) 400 can be used for the operations described previously, for example as or as part of the control system 150. The controller 400 is intended to include various forms of digital computers, such as printed circuit boards (PCB), processors, digital circuitry, or otherwise. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the control system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, a tape device, flash memory, a solid state device (SSD), or a combination thereof.

The input/output device 440 provides input/output operations for the controller 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method for determining facies of a subterranean reservoir, comprising: identifying, with one or more hardware processors, spectral gamma ray (SGR) logging data measured with an SGR logging tool in a wellbore that extends from a terranean surface into a subterranean reservoir comprised of a plurality of facies that include at least a first facies and a second facies; identifying, with the one or more hardware processors, logging data associated with a particular mineral in at least one of the plurality of facies measured with a logging tool in the wellbore; correlating, with the one or more hardware processors, the SGR logging data with the logging data associated with the particular mineral across the plurality of facies of the subterranean formation; determining, with the one or more hardware processors, a boundary between the first facies and the second facies based on the correlation; and preparing, with the one or more hardware processors, graphical data associated with the determined boundary between the first and second facies for presentation on a graphical user interface (GUI).

2. The computer-implemented method of claim 1, wherein the particular mineral comprises a heavy mineral.

3. The computer-implemented method of claim 2, wherein the heavy mineral comprises zircon.

4. The computer-implemented method of claim 2, wherein the heavy mineral is associated with glacial and proximal fluvial deposits.

5. The computer-implemented method of claim 1, wherein the logging data associated with the mineral comprises at least one of density, neutron, or sonic logging data of the subterranean reservoir that comprises a plurality of minerals including the particular mineral.

6. The computer-implemented method of claim 5, comprising:
separating, with the one or more hardware processors, logging data of the particular mineral from logging data of the plurality of minerals;
generating, with the one or more hardware processors, a curve associated with the logging data of the particular mineral; and
overlaying, with the one or more hardware processors, the curve associated with the logging data of the particular mineral with a curve of the SGR logging data.

7. The computer-implemented method of claim 1, wherein the first facies comprises at least one shale rock type, and the second facies comprises at least one heavy mineral rock type.

8. The computer-implemented method of claim 7, wherein:
the first facies is at least one of the Unayzah A facies, the Unayzah B facies, or the Jauf facies; and
the second facies is the Unayzah C facies.

9. A computing system, comprising:
one or more memory modules that store instructions; and
one or more hardware processors communicably coupled to the one or more memory modules and configured to execute the instructions to perform operations, comprising:
identifying spectral gamma ray (SGR) logging data measured with an SGR logging tool in a wellbore that extends from a terranean surface into a subterranean reservoir comprised of a plurality of facies that include at least a first facies and a second facies;
identifying logging data associated with a particular mineral in at least one of the plurality of facies measured with a logging tool in the wellbore;
correlating the SGR logging data with the logging data associated with the particular mineral across the plurality of facies of the subterranean formation;
determining a boundary between the first facies and the second facies based on the correlation; and
preparing graphical data associated with the determined boundary between the first and second facies for presentation on a graphical user interface (GUI).

10. The computing system of claim 9, wherein the particular mineral comprises a heavy mineral.

11. The computing system of claim 10, wherein the heavy mineral comprises zircon.

12. The computing system of claim 10, wherein the heavy mineral is associated with glacial and proximal fluvial deposits.

13. The computing system of claim 9, wherein the logging data associated with the mineral comprises at least one of density, neutron, or sonic logging data of the subterranean reservoir that comprises a plurality of minerals including the particular mineral.

14. The computing system of claim 13, wherein the operations comprise:
separating logging data of the particular mineral from logging data of the plurality of minerals;
generating a curve associated with the logging data of the particular mineral; and
overlaying the curve associated with the logging data of the particular mineral with a curve of the SGR logging data.

15. The computing system of claim 9, wherein the first facies comprises at least one shale rock type, and the second facies comprises at least one heavy mineral rock type.

16. The computing system of claim 15, wherein:
the first facies is at least one of the Unayzah A facies, the Unayzah B facies, or the Jauf facies; and
the second facies is the Unayzah C facies.

17. An apparatus comprising one or more tangible, non-transitory computer readable media that stores instructions executable by one or more hardware processors communicably coupled to the media to cause the one or more hardware processors to perform operations, comprising:
identifying spectral gamma ray (SGR) logging data measured with an SGR logging tool in a wellbore that extends from a terranean surface into a subterranean reservoir comprised of a plurality of facies that include at least a first facies and a second facies;
identifying logging data associated with a particular mineral in at least one of the plurality of facies measured with a logging tool in the wellbore;
correlating the SGR logging data with the logging data associated with the particular mineral across the plurality of facies of the subterranean formation;
determining a boundary between the first facies and the second facies based on the correlation; and
preparing graphical data associated with the determined boundary between the first and second facies for presentation on a graphical user interface (GUI).

18. The apparatus of claim 17, wherein the particular mineral comprises a heavy mineral.

19. The apparatus of claim 18, wherein the heavy mineral comprises zircon.

20. The apparatus of claim 18, wherein the heavy mineral is associated with glacial and proximal fluvial deposits.

21. The apparatus of claim 17, wherein the logging data associated with the mineral comprises at least one of density, neutron, or sonic logging data of the subterranean reservoir that comprises a plurality of minerals including the particular mineral.

22. The apparatus of claim 21, wherein the operations comprise:
separating logging data of the particular mineral from logging data of the plurality of minerals;

generating a curve associated with the logging data of the particular mineral; and overlaying the curve associated with the logging data of the particular mineral with a curve of the SGR logging data.

23. The apparatus of claim 17, wherein the first facies comprises at least one shale rock type, and the second facies comprises at least one heavy mineral rock type.

24. The apparatus of claim 23, wherein:
the first facies is at least one of the Unayzah A facies, the Unayzah B facies, or the Jauf facies; and
the second facies is the Unayzah C facies.

\* \* \* \* \*